(12) United States Patent
Reynolds

(10) Patent No.: US 9,359,732 B2
(45) Date of Patent: Jun. 7, 2016

(54) PET WASTE COLLECTION AND DISPOSAL APPARATUS

(71) Applicant: Tory Reynolds, Eden Prairie, MN (US)

(72) Inventor: Tory Reynolds, Eden Prairie, MN (US)

(*) Notice: Subject to any disclaimer, the term of this patent is extended or adjusted under 35 U.S.C. 154(b) by 323 days.

(21) Appl. No.: 13/949,562

(22) Filed: Jul. 24, 2013

(65) Prior Publication Data

US 2014/0159398 A1    Jun. 12, 2014

Related U.S. Application Data

(60) Provisional application No. 61/675,995, filed on Jul. 26, 2012, provisional application No. 61/820,528, filed on May 7, 2013.

(51) Int. Cl.
*A47L 9/14*      (2006.01)
*E01H 1/12*     (2006.01)
*B01D 46/02*  (2006.01)

(52) U.S. Cl.
CPC .............. *E01H 1/1206* (2013.01); *B01D 46/02* (2013.01); *A47L 9/1427* (2013.01)

(58) Field of Classification Search
CPC ..... E01H 1/1206; B01D 46/02; A47L 9/1427
USPC ............................................. 15/347, DIG. 8
IPC ......................................................... A47L 9/14
See application file for complete search history.

(56) References Cited

U.S. PATENT DOCUMENTS

| 4,185,355 A | 1/1980 | Williams |
| 4,488,331 A | 12/1984 | Ward |
| 4,956,892 A | 9/1990 | Fawkes |
| 5,661,873 A | 9/1997 | Karet |
| 5,771,531 A | 6/1998 | Swartz |
| 6,618,898 B2 | 9/2003 | Tingle |
| 7,003,846 B2 | 2/2006 | Holtz |
| 7,226,098 B1 | 6/2007 | Moreira |
| 2004/0123812 A1 | 7/2004 | Condon |
| 2004/0194248 A1 | 10/2004 | Holtz |
| 2004/0237906 A1 | 12/2004 | Waxman |
| 2006/0137132 A1 | 6/2006 | Orubor |
| 2008/0030032 A1 | 2/2008 | Gill |
| 2009/0267370 A1 | 10/2009 | Bell |
| 2009/0271942 A1 | 11/2009 | Reynolds |

FOREIGN PATENT DOCUMENTS

| DE | 202005009487 | 11/2005 |
| WO | 2007010077 | 1/2007 |

OTHER PUBLICATIONS

Feb. 4, 2014 PCT Search Report (Serial No. PCT/US13/52256).
Oct. 5, 2009—PCT International Search Report (PCT/US2009/000912).
Oct. 5, 2009—PCT Written Opinion (PCT/US2009/000912).
Feb. 5, 2015 PCT Preliminary Examination Report (Serial No. PCT/US13/52256).

*Primary Examiner* — David Redding
(74) *Attorney, Agent, or Firm* — Beck Tysver Evans PLLC

(57) ABSTRACT

A device for collecting and disposing of pet waste includes a housing containing a vacuum source. The housing is configured to receive a disposable liner bag. When closed, the housing holds the liner bag securely therein. The mouth of the bag is fed through the access port of the device such that the access port is insulated from contact with the waste being picked up. A bail holds the bag in place. A filtered bag is presented for use in the device.

4 Claims, 10 Drawing Sheets

PET WASTE COLLECTION AND DISPOSAL APPARATUS

CROSS REFERENCE TO RELATED APPLICATIONS

The present application is the utility conversion of two U.S. Provisional Applications. This application claims the benefit of U.S. Provisional Appl. No. 61/820,528, filed May 7, 2013. This application also claims the benefit of U.S. Provisional Appl. No. 61/675,995, filed Jul. 26, 2012.

FIELD OF THE INVENTION

The present application relates to the field of pet waste collection and handling. More particularly, the described embodiments relate to a powered device to retrieve pet waste from the ground or floor and store the waste in a disposal bag.

BACKGROUND

Pet waste cleanup is a relatively unpleasant chore for pet owners; yet, failure to clean up pet waste poses environmental hazards due to polluted ground water. Typical devices for waste collection have included shovels, scoopers and bags. These devices can be difficult to use and can become contaminated with waste during use.

DETAILED DESCRIPTION

Figure 1:
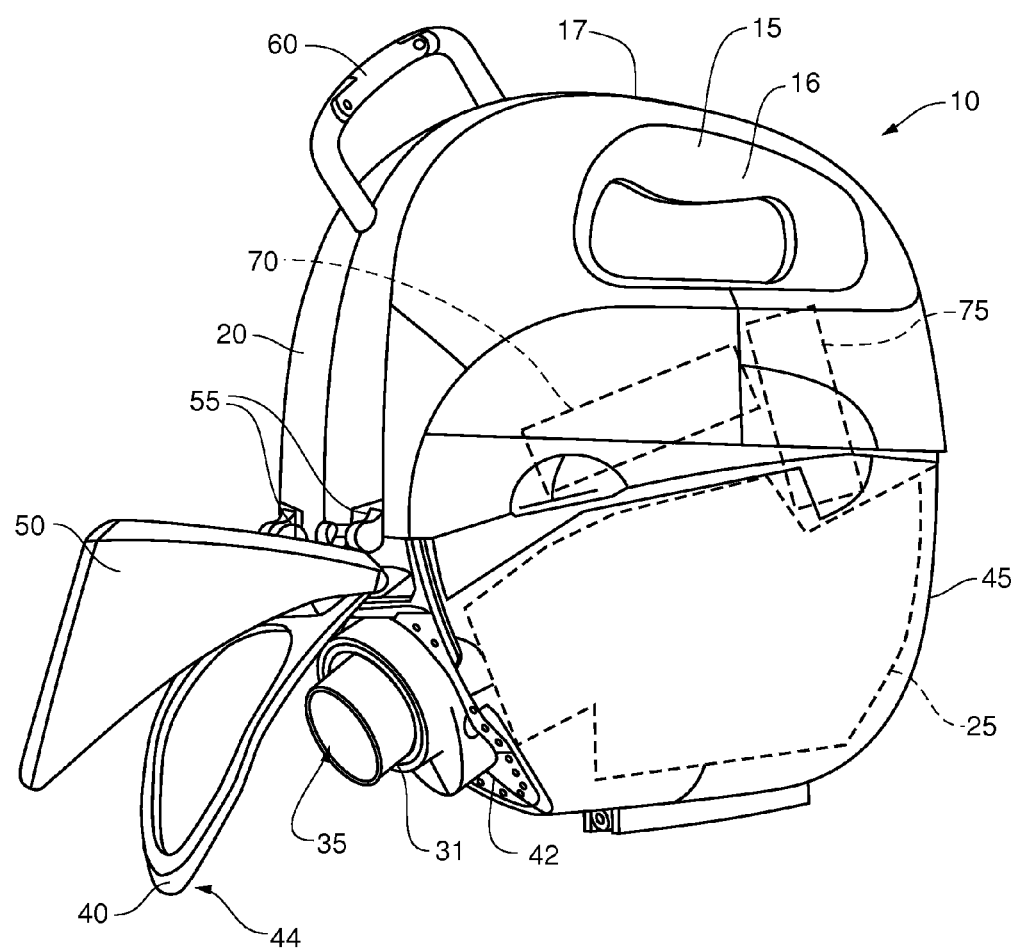
FIG. 1 shows a first embodiment of the present invention a perspective view.
Figure 2:
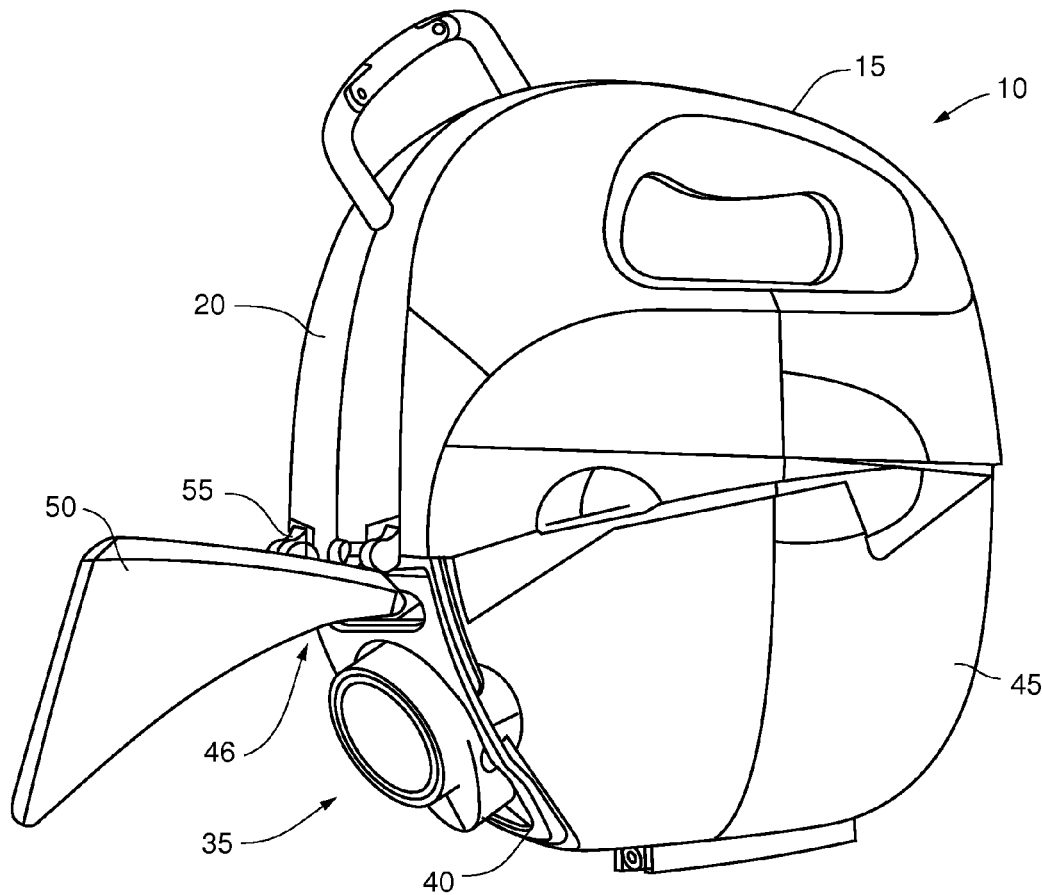
FIG. 2 shows the embodiment of FIG. 1 with a bail in the down position.
Figure 3:
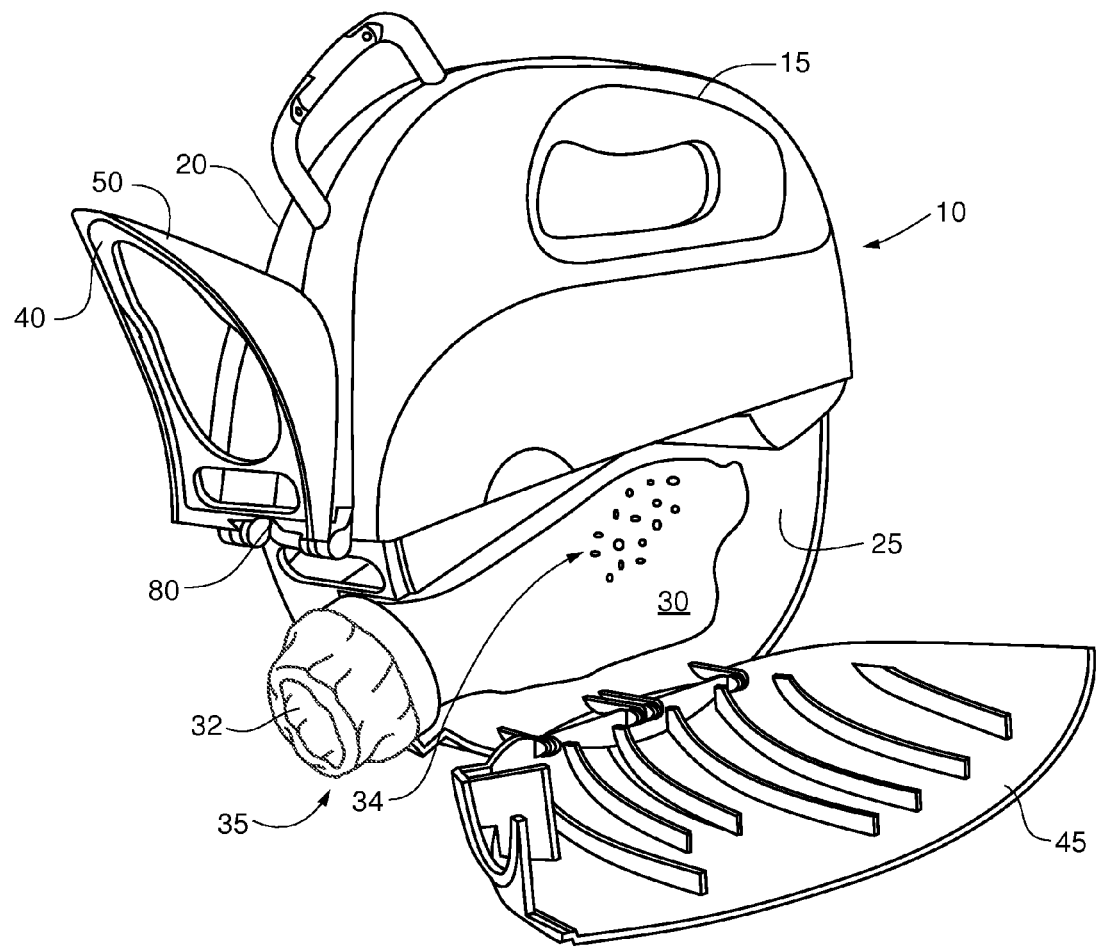
FIG. 3 shows the embodiment of FIG. 1 with a side door open exposing a bag.

FIGS. 1 through 7 show a device 10 for picking up and facilitating the disposal of solid pet waste. The device has a housing 20 that contains a battery 70 that powers an internal vacuum source 75 to exhaust a collection compartment 25. A side door 45 opens to provide access to the collection compartment 25, as shown in FIG. 3. The device has a handle portion 15 built into the housing 20 for carrying the device. In one embodiment, the handle portion has a soft, grip portion 16 that is made of a softer, more pliable material then the rest of the housing 20. A button 17 on the handle portion 15 controls power to the vacuum source 75. In the preferred embodiment, pressing the button 17 both powers the vacuum source 75 and illuminates an LED light 80 on the front side of the housing 20.

Figure 4:
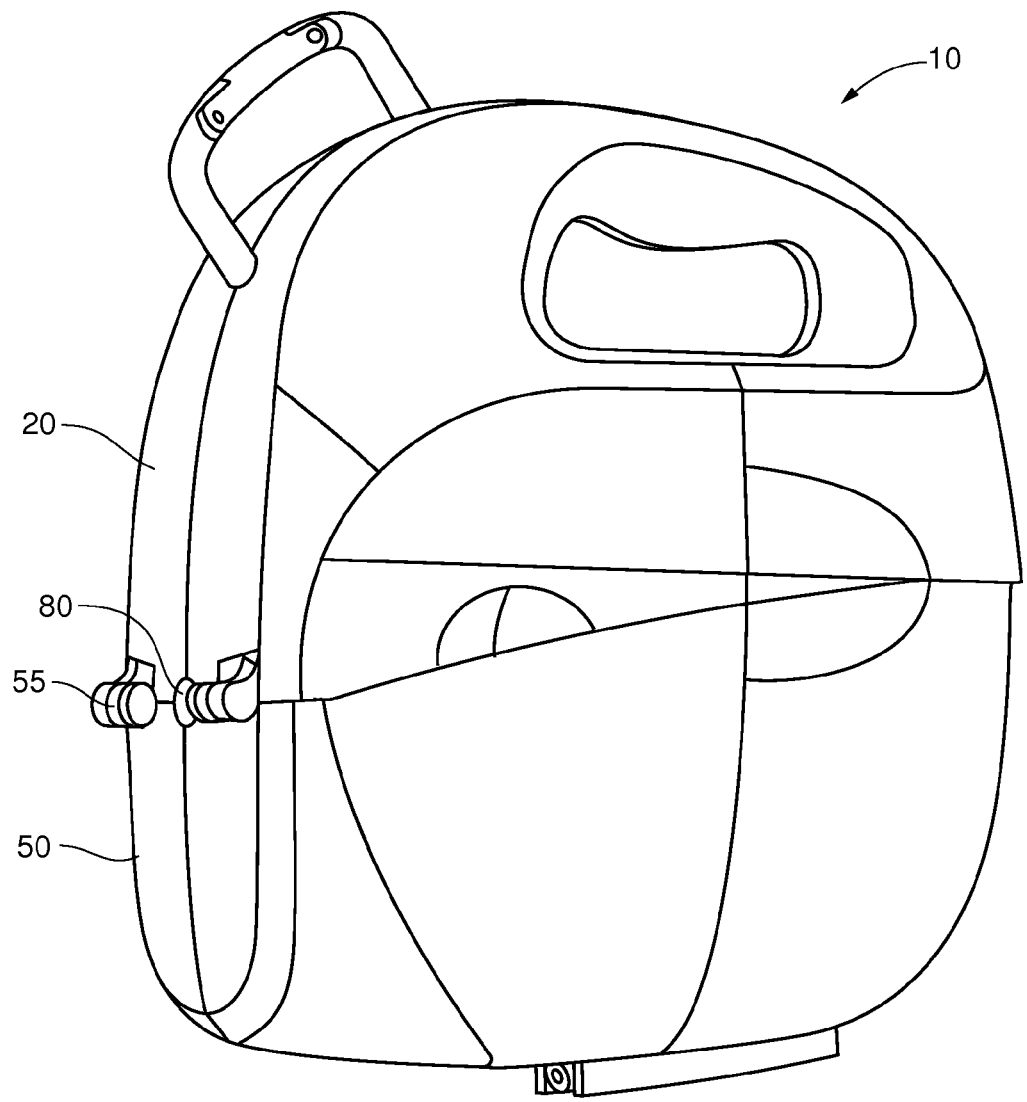
FIG. 4 shows the embodiment of FIG. 1 with an access door closed.
Figure 6:
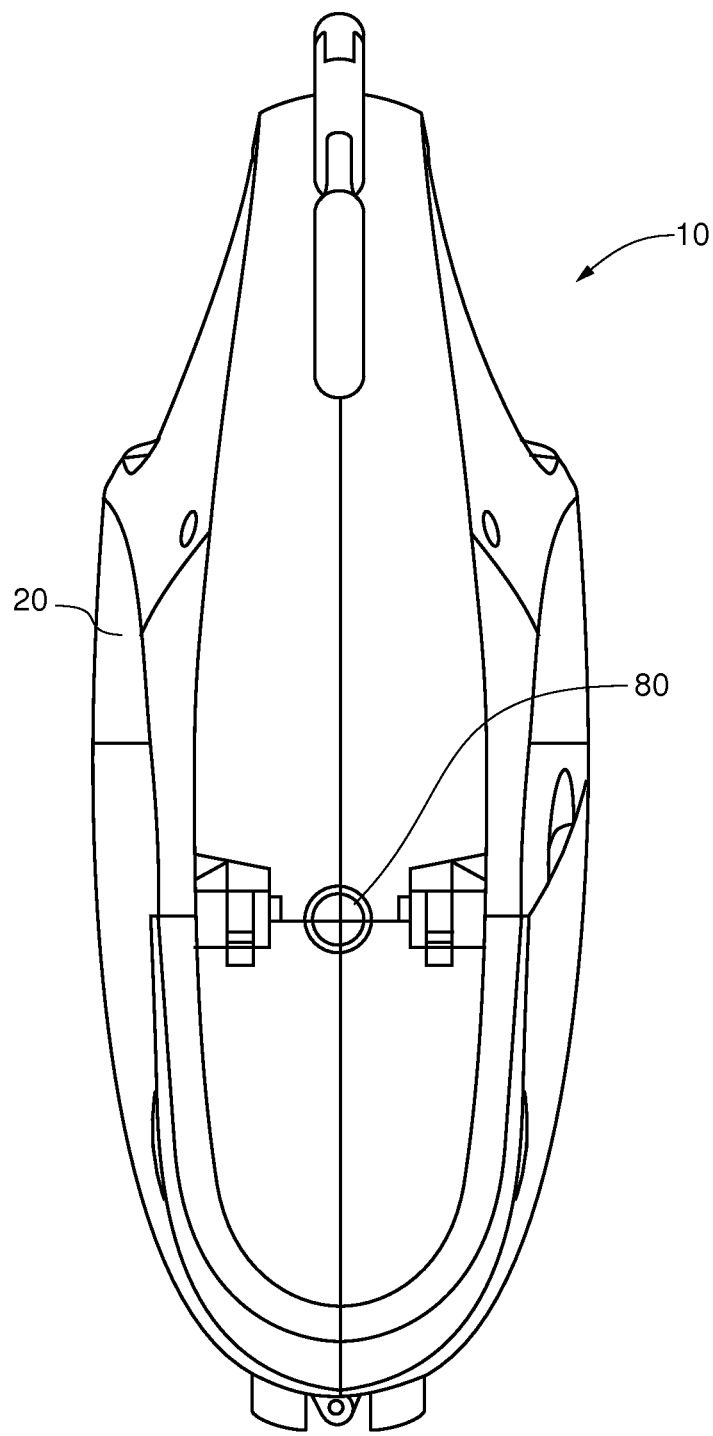
FIG. 6 shows a front plan view of the embodiment of FIG. 1, with the access door closed.
Figure 7:
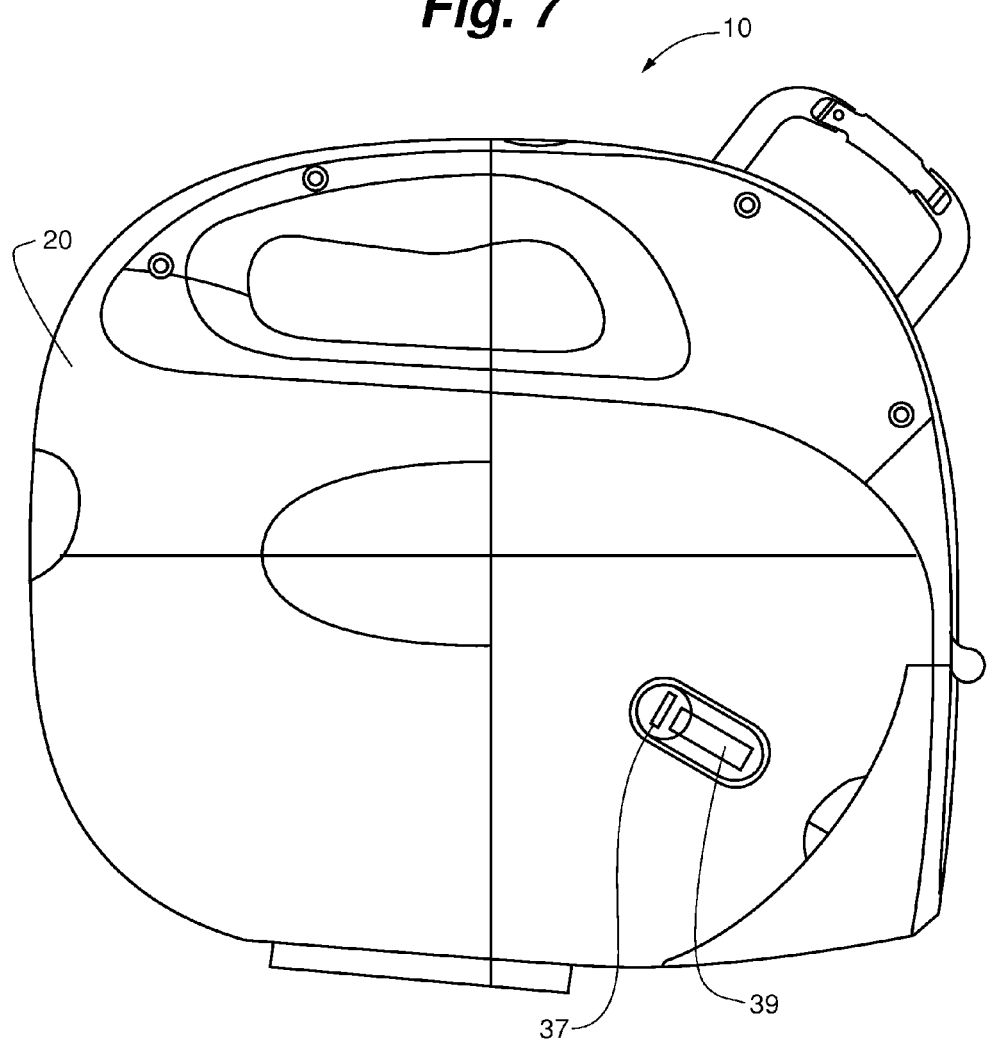
FIG. 7 shows a left side plan view of the embodiment of FIG. 1.

An access door 50 pivots about a hinges 55 to open and close the door 50. While FIGS. 1-3 show the device 10 with the access door open, FIGS. 4, 6 and 7 show the device 10 with the access door closed. The access door 50 is designed so that it does not interfere with use of the LED light 80. In the closed position, the LED light 80 shines through a hole in the housing 20 and the access door 50, as can best be seen in FIG. 4. When the access door 50 opens, a semi-circle opening at the edge of the door 50 flips from the bottom to the top of the LED light 80 as to avoid interfering with this light 80.

When the access door 50 is open, it exposes a bail 40 and an access port 35 to the collection compartment 25. The bail 40 swings via hinges 46 that are co-axial with the hinges 55 of the access door 50. The housing 20 is designed with a plurality of indentations 42 that are sized and position to interface with protrusions 44 on the back side of the bail 40. As shown in FIG. 1, the bail 40 can be swung upwards away from the indentations 42 of the housing 20 along with the access door 50. FIG. 3 shows both the access door 50 and the bail 40 in their extreme open positions, with the bail 40 received inside the access door 50.

The access port 35 provides a broad opening to the collection compartment 25 for the receipt and collection of solid pet waste. In the preferred embodiment, the access port 35 comprises a short, cylindrical tube that is capable of sliding relative to the device housing 20. This tube is directly connected to a sliding pin 37, found on the left side of the device 10 as shown in FIG. 7. This pin 37 slides within slot 39. When the pin 37 is slid toward the interior of the device 10 (as shown in FIG. 7), the access port 35 is withdrawn into the device 10. When the pin 37 is slid within slot 39 toward the exterior of the device 10, then the tube of the access port 35 is extended outward away from the housing 20 of the device 10. In the preferred embodiment, the tube of the access port 35 slides a distance between 1 and 5 cm.

Before using the device, a liner bag 30 must be inserted into the collection compartment 25. The liner bag 30 has an open mouth 32 through which solid waste can enter the bag, and a plurality of holes or apertures 34 through which the vacuum device can pull air through the bag 30. To insert the bag 30, the side door 45 of the device 10 is opened as shown in FIG. 3. The majority of the bag 30 is then positioned in the collection compartment 25. The mouth 32 of the bag 30 is passed through the access port 35 and then folded back over the top of the access port 35. In effect, the interior of the bag 30 is turned outward to cover and protect the access port 35. This prevents the pet waste from ever coming into contact with the access port 35, as only the interior of the bag comes into contact with the waste. An optional extension tube 31 may be used to increase the effective length of the access port 35. The extension tube internal diameter is seen in the deployed state in FIG. 1 and it is shown in the retracted position in FIG. 2. In general a sufficient amount of the bag 30 is pulled through the access port along with the extension tube so as to allow the bag to be held in place by the bail 40. The bail 40 is in the open position shown in FIG. 3 when the bag 30 is positioned. When the bail 40 is then closed, the bail 40 traps the mouth 32 of the bag 30 between itself 40 and the housing 20 of the device 10. The protrusions 44 of the bail 40 interface with the indentations 42 of the housing through the bag 30 itself to further secure the bag in place.

In use, the user grips a handle portion 15 of the device 10 and opens the access door 50 exposing the access port 35 covered by the mouth 32 of the bag 30. The access port 35 is then extended away from the device using the sliding pin 37. At this point, the user brings the access port 35 next to the solid waste. Then the user activates the vacuum system 75 via a switch 17 and the waste is sucked into the bag 30 within the collection compartment 25 of the housing 20. Next the pin 37 is retracted and the door 50 is closed. At this point, the use is over save the removal and disposal of the liner bag 30.

Figure 5:
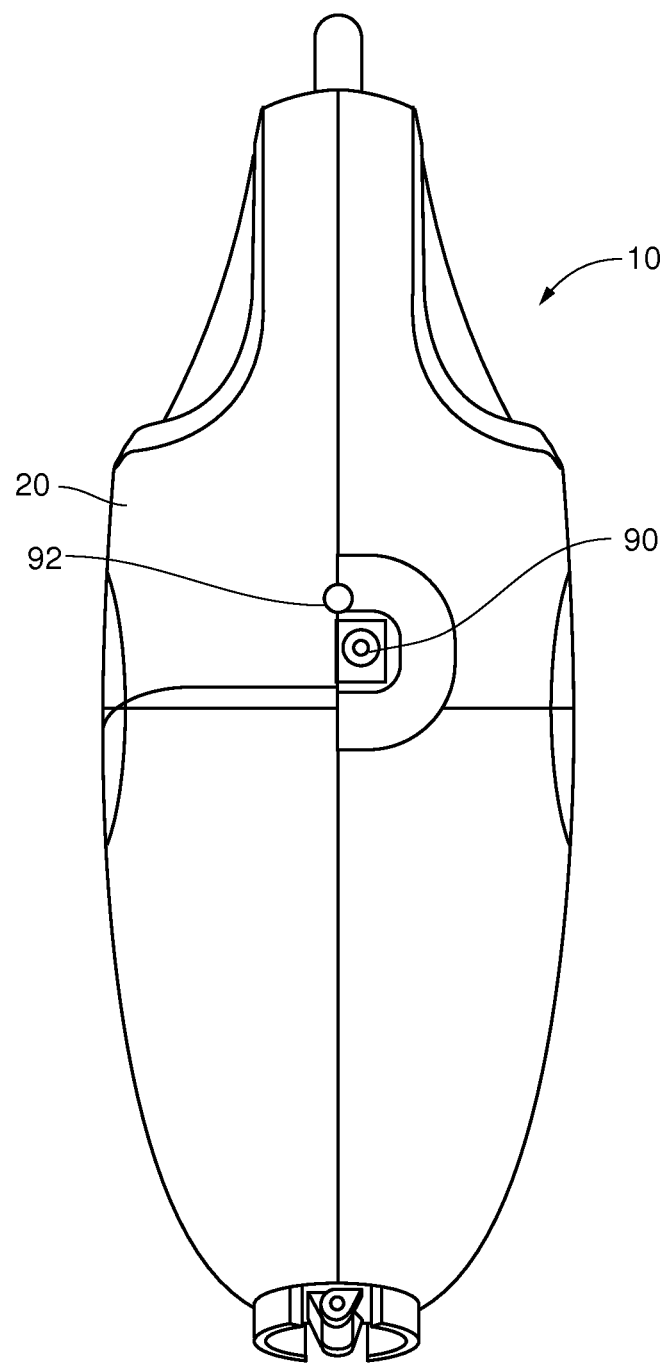
FIG. 5 shows a rear plan view of the embodiment of FIG. 1.

FIG. 5 shows a charging port 90 and a charge indicator light 92 on the rear of the device 10. By applying a direct current using an external power supply to the charging port 90, the internal battery 70 of the device 10 can be periodically recharged. During use, the rear of the device 10 is generally facing the user. This means that the charge indicator light 92 can be readily seen. In the preferred embodiment, the charge indicator light 92 glows steady during use to indicate that the device 10 has adequate battery power, and blinks when the internal battery 70 must be recharged.

The preferred embodiment 10 also includes a clip 60 with a spring loaded gate similar to those used in carabiners. By mounting the clip 60 on the front of the housing 20 forward of the handle 15, the clip 60 is conveniently positioned so as to be attached to a leash for use while walking a dog.

Figure 8:
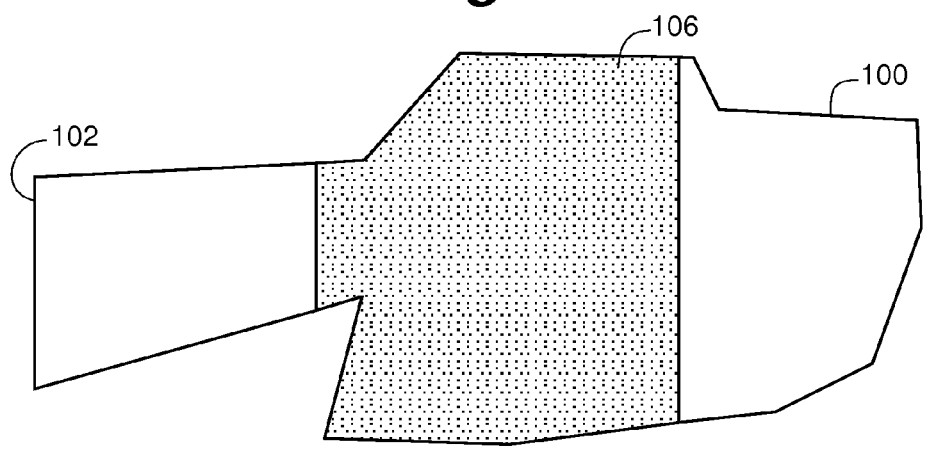
FIG. 8 shows a top plan view of an alternative embodiment of a bag for use in the present invention.
Figure 9:
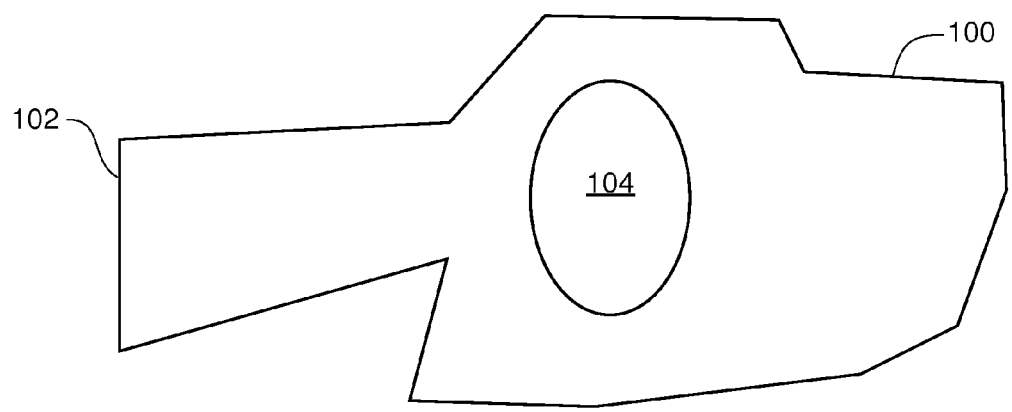
FIG. 9 shows the bag of FIG. 8 without filter material, thereby exposing a hole in the bag.
Figure 10:
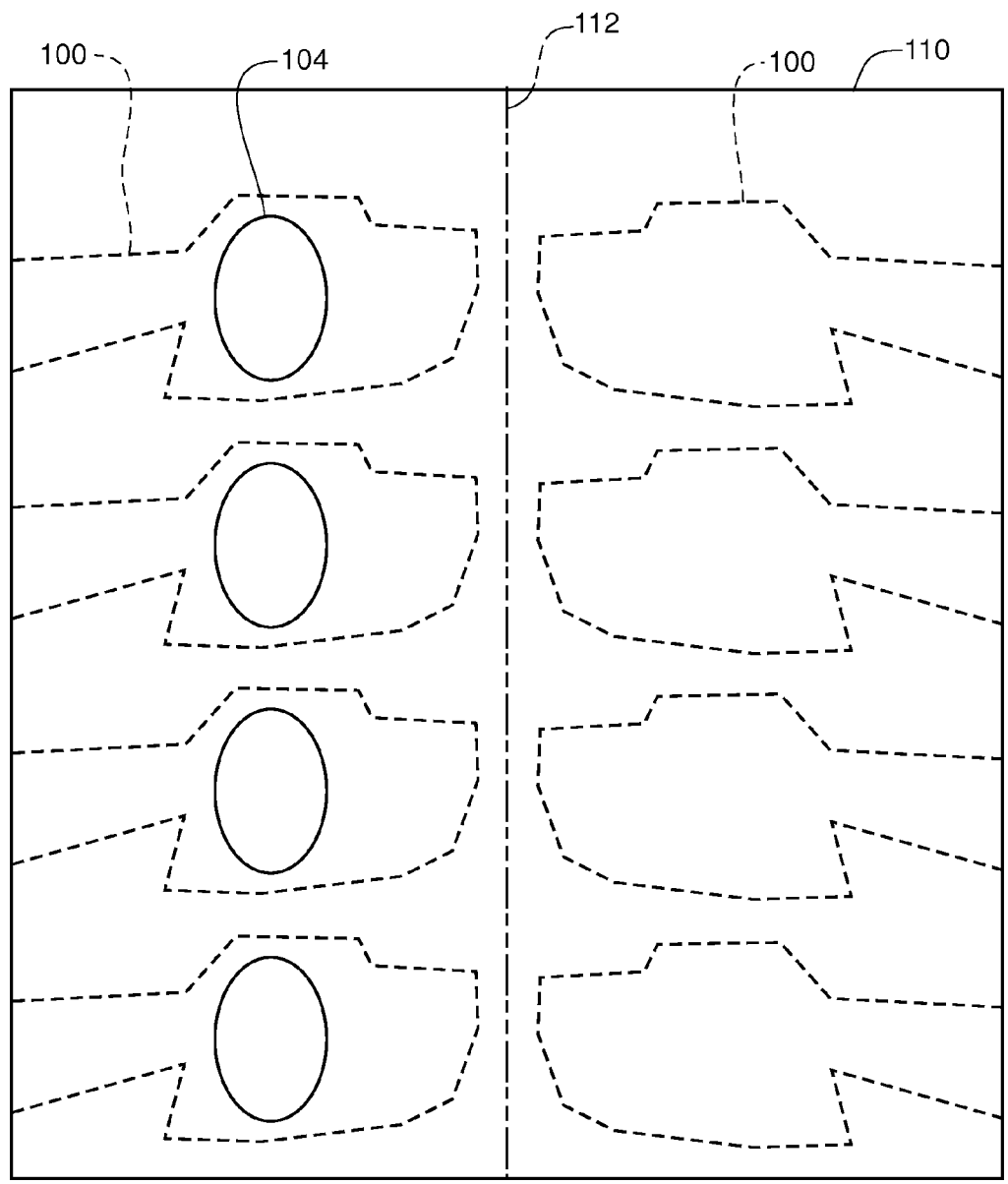
FIG. 10 shows a plastic sheet that can be used to create the alternative embodiment bag.
Figure 11:
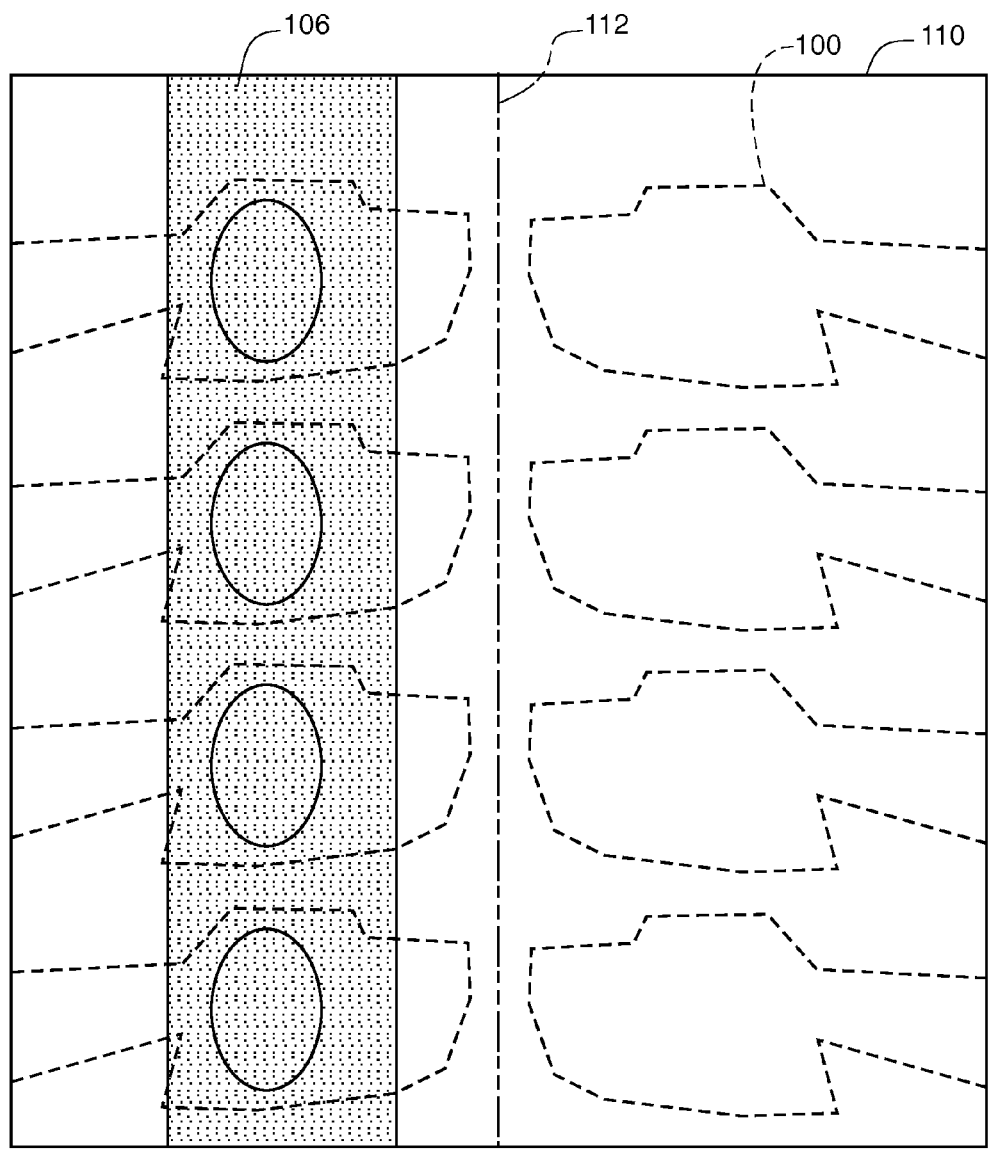
FIG. 11 shows the plastic sheet of FIG. 10 with a filter material attached to cover the holes.

FIGS. 8 and 9 show an alternative embodiment liner bag 100. In this embodiment, the liner bag 100 has a front side and a back side that are joined together around the perimeter of the bag 100 except at the mouth or inlet portion 102. As shown in FIGS. 10 and 11, the structure of the bag 30 is preferably formed by taking a single sheet 110 of plastic, such as polypropylene, and folding the sheet 110 on top of itself along fold line 112. The edges of the bag 100 can be fused or otherwise bonded together to form a bag 100, with the mouth or inlet portion 102 of the bag remaining unfused to allow waste to enter the bag 30. This fusing can be done as part of the process that forms the bags 100 from the sheet 110 by using a hot blade that cuts the shape of the bag 100 from the folded plastic sheet 110 at the same time it melts the two sides of the bags 100 together. As shown in FIGS. 10 and 11, a plurality of bags 100 can be formed from a single folded sheet 110.

In this embodiment, a hole 104 is formed on the front side of the bag 30. The holes 104 for the bags 100 can be formed by cutting or melting the holes 104 into the plastic sheet 110 before the sheet 110 is folded along line 112. This hole 104 in the bag 100 allows the vacuum 75 to create air flow through the bag 100 and pull pet waste through the access port 35 of the device 10. To prevent the waste from exiting the bag 100 through hole 104, the hole 104 is covered with a filter material 106 as shown in FIG. 8. In the preferred embodiment, this filter material 106 is attached to the plastic sheet 110 after the holes 104 are formed but prior to folding the sheet along line 112 and cutting out the bags 100. In one embodiment, the filter material 106 is attached to the sheet 110 through the use of two hot rollers that roll along the back edge of the sheet 110 on either side of the holes 104. In FIG. 11, the rollers would roll vertically along the sheet 110. The hot rollers press through the plastic sheet 110 against the filter material 106. Cold rollers press against the filter material 106 with the plastic sheet 110 and the filter material 106 passing between the hot and cold rollers. The hot rollers partially melt the plastic sheet 110 and bond the sheet to the filter material 106. When the sheet 110 is then folded and the bags 100 are cut with a hot blade, the filter material 106 is then bonded at the top and bottom edges of the bag 100. In this way, the filter material 106 is bonded to the plastic sheet on the front of the bag 100 completely around the hole 104. By performing the steps in this order, neither the filter material 106 nor the front face of the bag 100 is bonded to the back of the bag 100 except where desired around the circumference of the bag 100 (excluding the mouth 102). When the bag 100 is used in the device 10, the vacuum pulls air through the mouth 102, and out the hole 104 and the filter material 106, drawing pet waste through the mouth 102 of the bag 100 and the access port 35 of the device.

Since the vacuum will cause air to pass through the bag 100 and pass through outlet ports in the device, another improvement to the bag 100 is to provide a pleasant scent to the filter material 106 in order to minimize the smell of the pet waste. The device 10 can also incorporate a pliable gasket to help create a seal when the access door 50 is closed to further help reduce odors.

The many features and advantages of the invention are apparent from the above description. Numerous modifications and variations will readily occur to those skilled in the art. For instance, the alternative embodiment bags could be formed of two separate sheets of plastic rather than folding a single sheet over to form the back surface of the bag. Since such modifications are possible, the invention is not to be limited to the exact construction and operation illustrated and described. Rather, the present invention should be limited only by the following claims.

What is claimed is:

1. A solid waste collection device comprising:
 a housing defining an interior collection compartment;
 a side door covering said collection compartment;
 a battery operated vacuum source within said housing for drawing a vacuum in said interior collection compartment;
 an access port communicating with said collection compartment; and
 a liner retention bail proximate said access port.

2. The device of claim 1 further including:
 a liner bag adapted to fit in said collection compartment;
 said liner bag having at least one hole to permit air pressure in the collection compartment to equalize with the air pressure in said collection compartment.

3. The device of claim 2 further including:
 an extension tube have a first deployed state and a second retracted state, whereby the bail and extension tube together retain said liner bag in said access port.

4. The device of claim 3 further including:
 an access port door adapted to cover and uncover said access port.

* * * * *